United States Patent
Furukawa et al.

[11] Patent Number: 5,650,677
[45] Date of Patent: Jul. 22, 1997

[54] ELECTRIC MOTOR WITH BREATHER

[75] Inventors: Sumio Furukawa; Mitsushiro Shimura; Shigenori Watanuki, all of Yokohama, Japan

[73] Assignee: Jidosha Denki Kogyo Kabushiki Kaisha, Yokohama, Japan

[21] Appl. No.: 447,242

[22] Filed: May 22, 1995

[30] Foreign Application Priority Data

May 23, 1994 [JP] Japan ................................. 6-108639

[51] Int. Cl.$^6$ ................................. H02K 5/10; H02K 5/12
[52] U.S. Cl. ................................. 310/88; 310/58; 310/86; 310/89
[58] Field of Search ................................. 310/58–63, 88, 310/89

[56] References Cited

U.S. PATENT DOCUMENTS

| | | | |
|---|---|---|---|
| 3,571,634 | 3/1971 | Sato | 310/54 |
| 3,891,355 | 6/1975 | Hecht et al. | 417/731 |
| 4,544,166 | 10/1985 | Karasawa | 277/57 |
| 4,818,906 | 4/1989 | Kitamura et al. | 310/58 |
| 4,840,206 | 6/1989 | Hill et al. | 141/349 |
| 4,945,270 | 7/1990 | Okamoto | 310/88 |
| 5,006,742 | 4/1991 | Strobl et al. | 310/88 |
| 5,025,184 | 6/1991 | Sekine et al. | 310/71 |
| 5,164,625 | 11/1992 | Hofmann et al. | 310/88 |
| 5,184,039 | 2/1993 | Kraft | 310/89 |
| 5,185,544 | 2/1993 | Takada | 310/58 |
| 5,338,995 | 8/1994 | Takada | 310/89 |
| 5,343,101 | 8/1994 | Matani | 310/58 |

FOREIGN PATENT DOCUMENTS

| | | |
|---|---|---|
| 56-12023 | 5/1981 | Japan . |
| 34505691 | 4/1991 | Japan . |
| 2086145 | 5/1982 | United Kingdom . |
| 2276987 | 12/1994 | United Kingdom . |

*Primary Examiner*—Steven L. Stephan
*Assistant Examiner*—Elvin G. Enad
*Attorney, Agent, or Firm*—Sughrue, Mion, Zinn, Macpeak & Seas

[57] ABSTRACT

An electric motor is provided with a breather, which is made of elastic material such as rubber and provided with three triangular tongues protruding in the longitudinal direction of a tubular shaped breather body around about an aperture opening in the outside air. According to this invention, formation of waterdrops and membranous water is hindered in the aperture of the breather, and water penetration into the electric motor is prevented effectively.

14 Claims, 4 Drawing Sheets

ELECTRIC MOTOR WITH BREATHER

BACKGROUND OF THE INVENTION

1. Field of the Invention

This invention relates to an electric motor provided with a breather used for ventilating the inside of the motor body of the electric motor in order to maintain pressure in the motor body at atmospheric pressure.

2. Description of the Prior Art

Heretofore, as a breather for introducing air in the motor body, there has been known a breather disclosed in Japanese Utility Model disclosure (kokai) No. 3-45056/91, for example.

Generally, the breather is formed in a pipe-like shape and so designed as to be fixed to a vent hole of an electric motor at one end of the tubular body, the other end of the tubular body of the breather is opened and directed downwardly.

In the electric motor provided with the breather of this kind, when an armature of the motor rotates according to power supply, coils of the armature generate heat by electric current flowing in the coils, whereby air in the motor body is heated and expanded. The expanded air is discharged through the breather. Thereafter, when the power supply is interrupted, the heated air in the motor body is cooled and contracts whereby the air is introduced on the inside of the motor body through the breather.

Furthermore, if the motor is splashed with water when the motor is supplied with an electric current and air in the motor body is heated at a high temperature, the motor is cooled by the water and the air in the motor body contracts. Also in this case, the outside air is introduced in the motor body through the breather.

However, if the electric motor having the breather is splashed with a large amount of water, especially on the breather, the opening of the tubular-shaped breather may be filled up with a waterdrop, and the waterdrop caught at the opening of the breather sometimes changes into membranous water and is held by the internal face of the tubular-shaped breather under the action of surface tension of water. Accordingly, there is a problem in the aforementioned conventional breather since there is the possibility that the water drop or the membranous water may be sucked and penetrate into the motor body if the air in the motor body contracts in the state where the water drop or the membranous water fills up the opening of the breather.

The breather described in the aforementioned document is provided with projections 4, 5 and 6 in a tubular body 2, and it is possible to prevent the water penetration in some degree, however it is difficult to form the plurality of the opposed projections alternatively in the tubular body of the breather.

SUMMARY OF THE INVENTION

Therefore, this invention is made in view of the aforementioned problem of the prior art, and it is an object to provide an electric motor with a breather which is possible to prevent water penetration effectively even if the electric motor is splashed with a large amount of water.

The construction of the electric motor according to this invention in order to accomplish the above-mentioned object is characterized by comprising a motor body formed of a hollow-cylindrical shaped yoke and an end bracket covering an opening end of the yoke, a magnet secured on an inner peripheral face of the yoke of the motor body, an armature disposed rotatably on an inner side of the magnet and rotating according to power supply, and a breather connected to a vent hole passing through between inside and outside of the motor body, wherein the breather is provided with a fitting portion to be fitted to the vent hole of the motor body at a base end of a breather body formed in a tubular shape and an aperture opening at a free end of the breather body, and the free end of the breather body is formed with a plurality of tongues projecting in the longitudinal direction of the breather body around about the aperture thereof.

The electric motor according to another independent claim of this invention is characterized by comprising a motor body formed of a hollow-cylindrical shaped yoke and a gear casing connected with the yoke, a magnet secured on an inner peripheral face of the yoke of the motor body, an armature disposed rotatably on an inner side of the magnet and rotating according to power supply, a reduction gear housed in the gear casing, an output shaft connected with an armature shaft of the armature through the reduction gear, and a breather connected to a vent hole passing through between inside and outside of the motor body, wherein the breather is provided with a fitting portion to be fitted to the vent hole of the motor body at a base end of a breather body formed in a tubular shape and an aperture opening at a free end of the breather body, and the free end of the breather body is formed with a plurality of tongues projecting in the longitudinal direction of the breather body around about the aperture thereof.

In the electric motor according to an embodiment of this invention, it is preferable to make the tongues of the breather body longer than inside diameter of the tubular-shaped breather body and desirable to make the tongues of the breather body so as to decrease widths of the tongues gradually toward the extreme ends of the tongues in another embodiment according to this invention. The free end of the breather body may be formed with three tongues having triangular or rectangular shapes in the other embodiment according to this invention. Furthermore, it is preferable to make the breather with the elastic material such as synthetic rubber in the other embodiment of this invention.

In the electric motor having the breather according to this invention, since the breather is provided with tongues having, for example, the triangular or rectangular shapes longer than the inside diameter of the breather body around about the aperture at the free end of the tubular-shaped breather body, an opening area of the aperture of the breather becomes larger than an opening area of the tubular-shaped breather body at a cross section substantially by forming the tongues, accordingly it becomes difficult to fill the aperture of the breather with a waterdrop or membranous water even if the motor is splashed with a large amount of water. In the electric motor according to the other embodiment of this invention, which is provided with the breather of which tongues have the widths decreasing gradually toward the extreme ends thereof, the waterdrop or the membranous water becomes further difficult to be held at the aperture of the breather as splashed water flows concentrically to the extreme ends of the respective tongues. Furthermore, in the electric motor according to the other embodiment of this invention, which is provided with the breather made of elastic material such as rubber, the breather body and the tongues are allowed to be deformed or vibrated by splashed water and so on. Therefore, the waterdrop or membranous water becomes further hard to be held at the aperture of the breather.

DESCRIPTION OF THE PREFERRED EMBODIMENT

An embodiment of the electric motor according to this invention will be described below on basis of FIG. 1 to FIG. 5.

Figure 1:
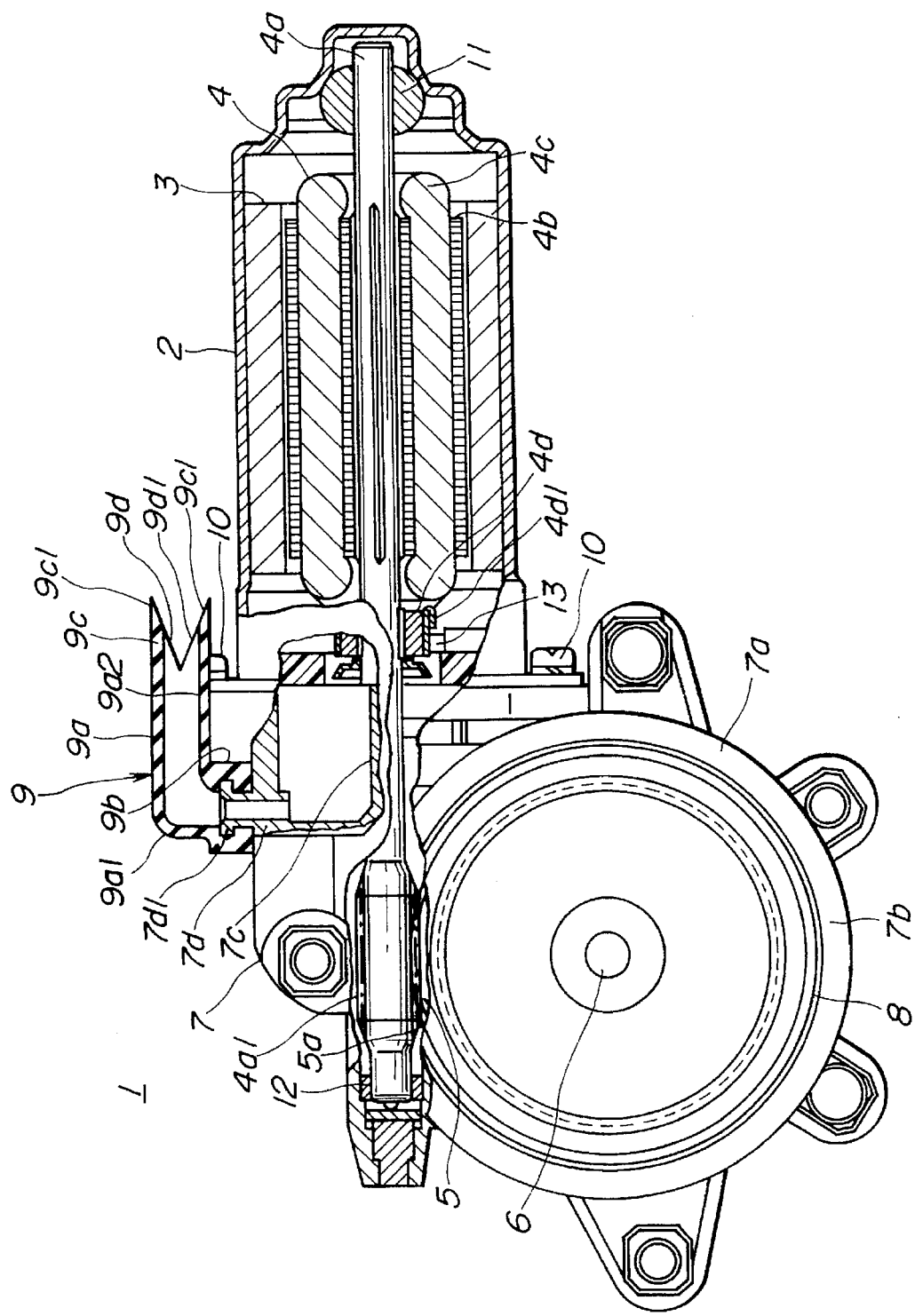
FIG. 1 is a vertical sectional front view illustrating an embodiment of an electric motor according to this invention.
Figure 2:
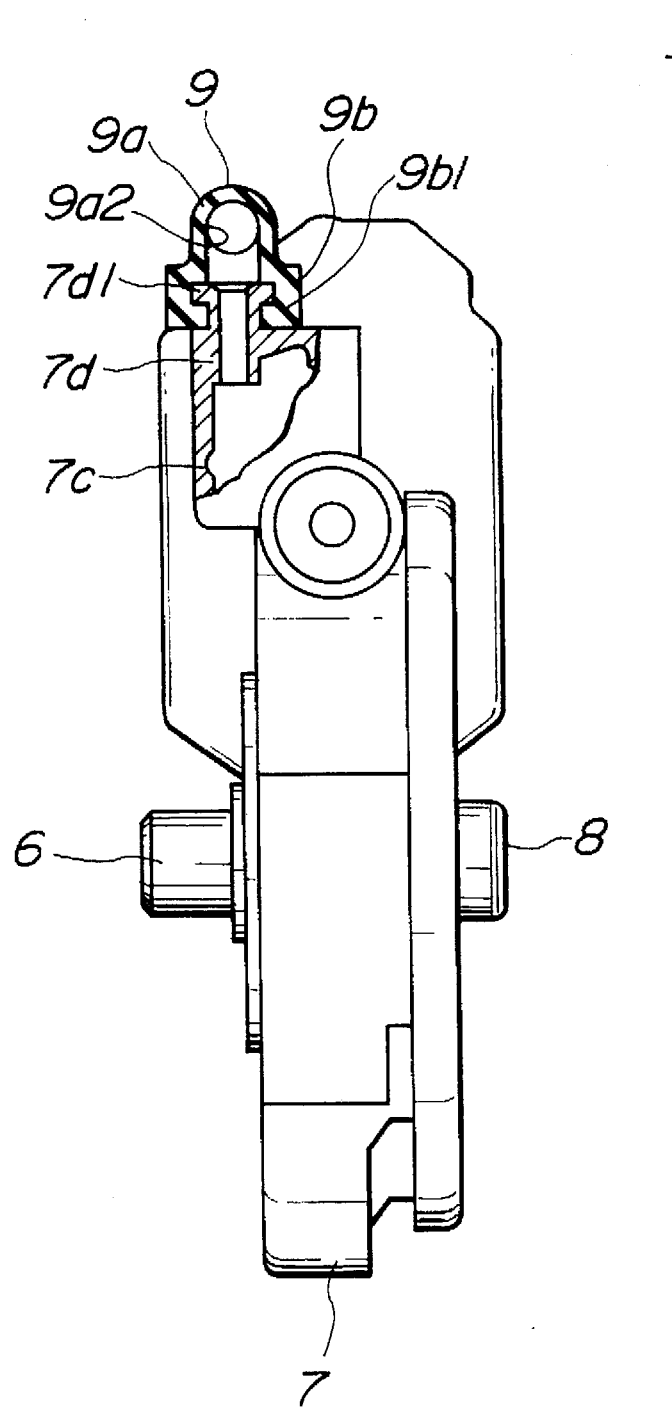
FIG. 2 is a partially sectional side view of the electric motor shown in FIG. 1.

An electric motor 1 shown in FIG. 1 and FIG. 2 is the motor used for actuating a window glass in the power window apparatus mounted on the vehicle body and mainly composed of a yoke 2, a magnet 3, an armature 4, a reduction gear 5, an output shaft 6, a gear casing 7, a gear cover 8 and a breather 9, and the yoke 2 forms a motor body together with the gear casing 7.

The yoke 2 is formed in a hollow cylindrical shape and fixed to the gear casing 7 by screwing screws 10 at an open end thereof. Semi-cylindrical shaped two magnets 3 are secured on the inner face of the yoke 2 and the armature 4 is disposed rotatably on the inner side of the magnets 3.

The armature 4 is fixed with an armature core 4b on an armature shaft 4a at a position corresponding to the magnets 3, and armature coils 4c are wound around the armature core 4b. The armature coils 4c are connected to commutator pieces 4d1 of a commutator 4d secured on the armature shaft 4a at a position close to the armature core 4b.

The armature shaft 4a of the armature 4 is supported rotatably by a bearing 11 disposed in the bottom of the yoke 2 and a bearing 12 fitted in the gear casing 7, so that the armature 4 rotates by supplying electric current to the armature coils 4c through brushes 13 disposed to be contacted with the commutator 4d.

The gear casing 7 is formed with a gear container part 7b encircled by a side wall 7a in which the reduction gear 5 and a part of the armature shaft 4a are housed. The gear container part 7b is covered with the gear cover 8 and closed by screws (not shown).

The armature shaft 4a is formed with a worm 4a1 forming a part of the reduction gear 5 at a position projecting in the gear container part 7b of the gear casing 7, and the worm 4a1 is meshed with a worm wheel 5a forming the other part of the reduction gear 5 and fixed to the output shaft 6 supported rotatably by the gear casing 7. Therefore, the rotary power of the armature 4 is transmitted to the output shaft 6 after speed reduction through the reduction gear 5. The output shaft 6 is connected mechanically with a window regulator for moving a window glass upward or downward on the outside of the gear casing 7.

Furthermore, the gear casing 7 is formed with a communicating part 7c apart from the gear container part 7b and opening on the side of the yoke 2 at the connecting part with the yoke 2. The communicating part 7c communicates with the outerside through a vent hole 7d bored in an outer wall of the gear casing 7.

The gear casing 7 is formed with a breather engaging portion 7d1 projecting in a ring-like shape on the outer side of the vent hole 7d, and the breather 9 is fitted on the breather engaging portion 7d1.

Figure 3:
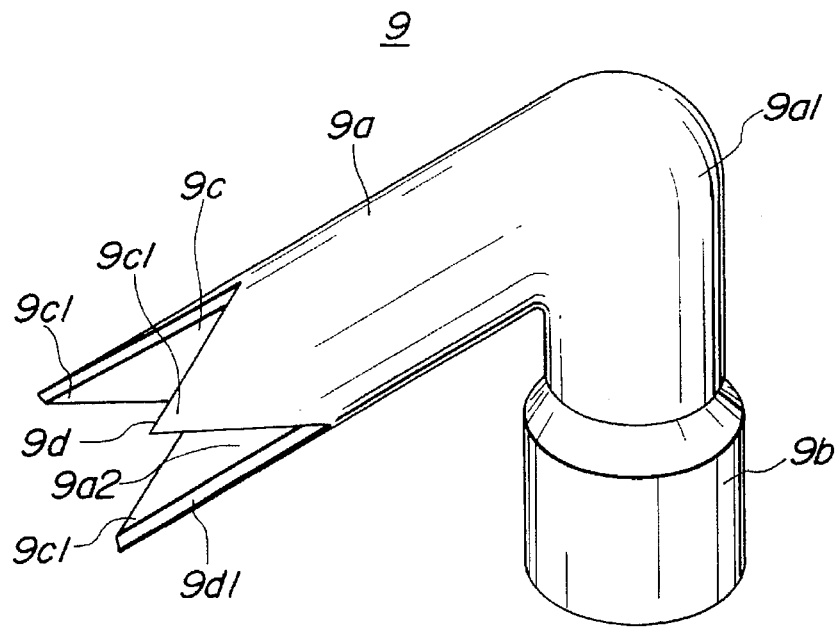
FIG. 3 is a perspective view illustrating external appearance of the breather in the electric motor shown in FIG. 1.

The breather 9 is composed of a breather body 9a formed in a tubular shape with rubber having flexibility, a fitting portion 9a formed in a thick-walled cylindrical shape at an end (base end) of the breather body 9a, an aperture 9c opening at another end (free end) of the breather body 9a, and tongues 9d projecting in the longitudinal direction of the breather body 9a around the aperture 9c as shown in FIG. 3.

The breather 9 is formed in a L-like shape by bending the breather body 9a at an angle of 90 deg approximately in a bending part 9a1.

Figure 4:
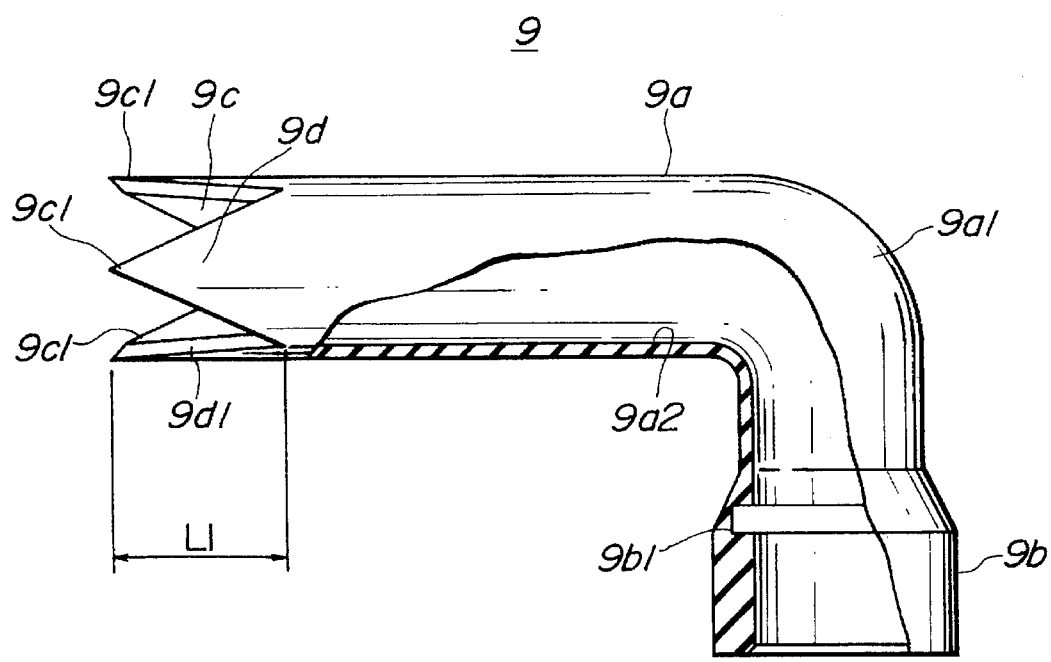
FIG. 4 is a partially sectional front view of the breather shown in FIG. 3.
Figure 5:
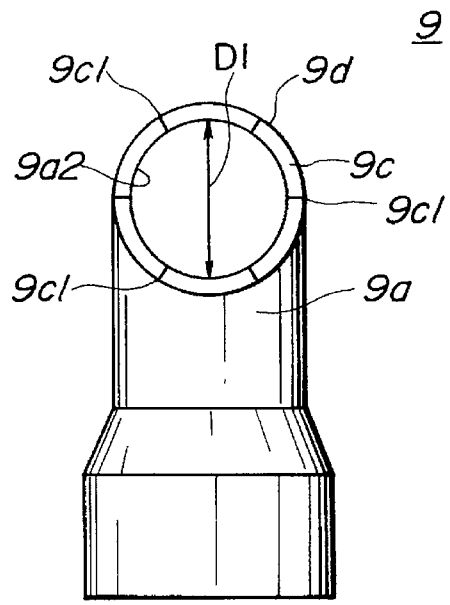
FIG. 5 is a side view of the breather shown in FIG. 3.

The fitting portion 9b is formed in thick-walled cylindrical shape having outside diameter larger than that of the breather body 9a and formed with an annular groove 9b1 to be engaged with a flange disposed on the breather engaging portion 7d1 of the gear casing 7 as shown in FIG. 4. Therefore, the breather 9 is so designed as to be attached elastically to the gear casing 7 of the motor body by press-fitting the fitting portion 9b of the breather 9 onto the breather engaging portion 7d1 of the gear casing 7 in a state of connecting an air passage 9a2 of the breather 9 with the vent hole 7d of the gear casing 7.

The breather 9 is provided with an aperture 9c opening at the opposite end (free end) to the fitting portion 9b and makes the communicating part 7c of the gear casing 7 to communicate with the open air through the air passage 9a2, that is the inside of the motor body communicates with the open air. The breather 9 is arranged on the electric motor as a power window motor mounted on the vehicle body so that the aperture 9c may be directed downwardly.

The breather 9 is further provided with three tongues 9d formed in triangular shapes around about the aperture 9c in the peripheral edge at the free end of the breather body 9a. The respective tongues 9d are provided with pointed ends 9c1, and formed in lengths L1 larger than the inside diameter D1 (shown in FIG. 5) of the tubular-shaped breather body 9a. Therefore, peripheral length of the aperture 9c becomes larger than the circumference ($\pi$D1) of the aperture 9c by six sides 9d1 of the three tongues 9d having widths decreasing gradually toward the extreme ends thereof, and therefore water membrane is not easily made along the sides 9d1 of the tongues 9d.

Furthermore, the breather 9 is made of rubber having elasticity and, the tongues 9d are formed in triangular shapes and the widths of the tongues 9d become smaller toward the pointed ends 9c1. Therefore, the rubber-made tongues 9d easily vibrate according to joggle of the vehicle body or so, and the splashed water flowing along through the outer wall of the breather body 9a drops easily from the tongues 9d and the vibrating tongues 9d prevent the formation of the membranous water at the aperture 9c or along the sides 9d1 of the tongues 9d of the breather 9.

Additionally, splashed water on the breather 9 flows easily downwardly along the tongues 9d, so the water path is not formed toward the radial direction at the aperture 9c. Therefore, the breather 9 can prevent the formation of the membranous water by preventing the splashed water to pass through the aperture 9c in the radial direction of the breather. Although the breather provided with the three tongues 9d in this embodiment, the number of the tongues 9d is not limited to three and it is preferable to arrange the tongues in odd number so as not to face each other at the aperture 9c.

The electric motor 1 having the aforementioned structure is mounted in the door panel of the automotive vehicle, the output shaft 6 of the motor 1 is connected to the window regulator of the power window apparatus (not shown), and the external power circuit (not shown) is connected to the brushes 13 of the motor 1. In this time, the breather 9 of the motor 1 is disposed so that the aperture 9c of the breather may be directed to the lower side of the vehicle.

By switching on the window switch (not shown) on the opening side, an electric current flows in the armature coils 4c in the forward rotational direction from the external power circuit through the brushes 13 and the commutator 4d, whereby the armature 4 rotates in the forward direction. The output shaft 6 also rotates in the forward direction according to the rotation of the armature 4 and the window glass is moved downwardly on basis of the forward rotation of the output shaft 6.

Contrary to this, by switching on the window switch on the closing side, an electric current flows in the armature coils 4c in the reverse direction from the external power circuit, whereby the armature 4 rotates in the reverse direction. The output shaft 6 rotates in the reverse direction according to the rotation of the armature 4, thereby moving the window glass upwardly.

When the armature 4 is rotating in the forward or reverse direction according to the switching operation of the window switch, the armature coils 4c is successively excited according to the current supply from the brushes 13 through the commutator pieces 4d1 of the commutator 4d and the armature 4 generates heat owing to the resistance loss.

When air in the motor body is heated by the heat generated from the armature 4 and expanded, the air expanded in the motor body is discharged on the outside of the motor body through the communicating part 7c and the vent hole 7d of the gear casing and the air passage 9a2 of the breather 9 whereby the inner pressure of the motor body is regulated to the atmospheric pressure.

If the motor body (gear casing 7 and yoke 2) is splashed with water by a rainfall or car-washing, the splashed water flows toward the aperture 9c through the outer wall of the breather body 9a of the breather 9.

The water arriving to the aperture 9c after flowing on the outer wall of the breather 9 is concentrated at the pointed ends 9c1 of three triangular tongues 9d and falls very easily from the respective pointed ends 9c1 without remaining in the aperture 9c because the breather 9 is provided with three triangular tongues 9d having pointed ends 9c1 around the aperture 9c. Furthermore, the opening area at the aperture 9c and the distance between the pointed ends 9c1 vary according to the deformation and the vibration of the rubber-made breather body 9a and the tongues 9d caused by the joggle of the vehicle body and so on, whereby the water at the aperture 9c is dispersed forcibly into small water droplets without remaining in the aperture 9c and forming the membranous water. Namely, the waterdrop and the membranous water are not formed so easily in the aperture 9c of the breather, and it is possible to prevent the water penetration effectively even if the electric motor 1 is splashed with a large amount of water and negative pressure is caused in the motor body.

Figure 6:
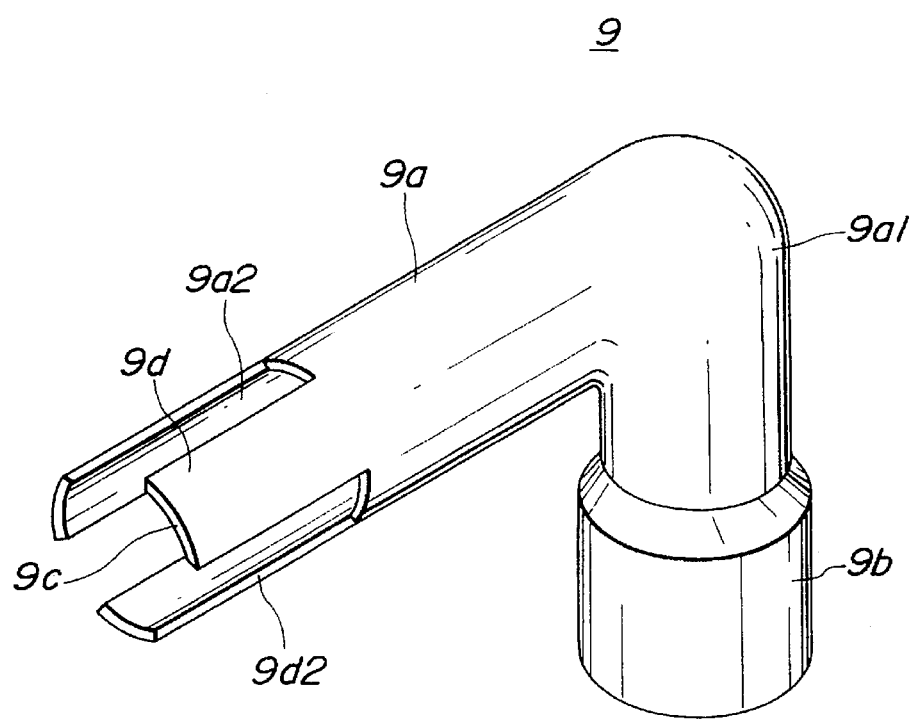
FIG. 6 is a perspective view illustrating external appearance of another example of the breather to be applied to the electric motor according to this invention.

The other example of the breather is shown in FIG. 6.

In this case, the breather 9 is also made of rubber and provided with three rectangular tongues 9d around about the aperture 9c by cutting out the peripheral edge of the free end of the breather body 9a at three points in rectangular shapes. The breather 9 of this example is structured similarly to the aforementioned breather excepting the above points.

The tongues 9d have cut faces 9d2 and lengths larger than the inside diameter of the breather body 9a. Therefore, the substantial opening area at the aperture 9c becomes larger by the tongues 9d and area to be held with waterdrops becomes smaller at the aperture 9c. Accordingly, the breather 9 has a function for preventing the waterdrop and the membranous water to be formed in the aperture 9c similarly to the aforementioned breather. Namely, water flowing on the outer wall of the breather body 9a and arriving at the aperture 9c falls through the tongues 9d naturally or forcibly by the vibration of the rubber-made breather body 9a without remaining in the aperture 9c or without forming the membranous water covering the aperture 9c.

As mentioned above, the electric motor according to this invention is provided with the breather formed with tongues having rectangular shapes, for example, and protruding in the longitudinal direction of the tubular-shaped breather body around about the aperture opening in the outside air. Therefore, the substantial opening area becomes larger by the tongues and an excellent effect can be obtained in that it is possible to prevent the formation of relatively large waterdrops and membranous water in the aperture of the breather and possible to prevent the water penetration into the motor body even if the electric motor is splashed with a large amount of water. In the electric motor according to an embodiment of this invention provided with the breather of which tongues with rectangular shapes, for example, have lengths larger than the inside diameter of the tubular-shaped breather body, a further effect can be obtained since it is possible to prevent the water penetration more effectively. In the electric motor according to another embodiment of this invention provided with the breather of which tongues have widths decreasing gradually toward the extreme ends of the tongues, a further effect can be obtained in that water flows concentrically toward the pointed ends of the tongue and falls through the pointed ends at the extreme ends of the tongues, and it is possible to prevent effectively the formation of the waterdrops and the membranous water. Furthermore, in the electric motor according the other embodiment of this invention of which breather is made of elastic material such as synthetic rubber, the breather body and the tongues are vibrated by splashed water and joggle of the motor vehicle mounted with the electric motor, therefore it is possible to prevent the formation of the waterdrops and the membranous water more effectively, so that the splashed water never penetrates into the motor body.

What is claimed is:

1. An electric motor comprising:

a motor body formed of a hollow-cylindrical shaped yoke and an end bracket covering an open end of the yoke;

a magnet secured on an inner peripheral face of the yoke of the motor body;

an armature rotatably disposed on an inner side of the magnet and for rotation by a power supply; and a breather connected to a vent hole passing through the motor body between inside and outside of the motor body;

wherein said breather is provided with a fitting portion secured to the vent hole of the motor body at a base end of a breather body formed in a longitudinally extending tubular shape and having an opening at a free end of said breather body, wherein said free end of the breather body is formed with a plurality of tongues projecting in a longitudinal direction of the breather body around said opening with respective sides of adjacent tongues being separated from each other to prevent formation of water membranes along opposite sides of the tongues, and wherein each of said tongues of the breather body has a length larger than inside diameter of the tubular-shaped breather body.

2. An electric motor as set forth in claim 1, wherein each of said tongues of the breather body has a width decreasing gradually toward an extreme end thereof.

3. An electric motor as set forth in claim 1, wherein said free end of the breather body is formed with three tongues having triangular shapes.

4. An electric motor as set forth in claim 1, wherein said free end of the breather body is formed with three tongues having rectangular shapes.

5. An electric motor as set forth in claim 2, wherein said breather is made of elastic material such as synthetic rubber.

6. An electric motor as set forth in claim 3, wherein said breather is made of elastic material such as synthetic rubber.

7. An electric motor as set forth in claim 4, wherein said breather is made of elastic material such as synthetic rubber.

8. An electric motor comprising:
   a motor body formed of a hollow-cylindrical shaped yoke and an end bracket covering an open end of the yoke;
   a magnet secured on an inner peripheral face of the yoke of the motor body;
   an armature rotatably disposed on an inner side of the magnet and for rotation by a power supply;
   a reduction gear housed in the gear casing;
   an output shaft connected with an armature shaft of the armature through said reduction gear; and
   a breather connected to a vent hole passing through the motor body between inside and outside of the motor body;
   wherein said breather is provided with a fitting portion secured to the vent hole of the motor body at a base end of a breather body formed in a longitudinally extending tubular shape and having an opening at a free end of said breather body, wherein said free end of the breather body is formed with a plurality of tongues projecting in a longitudinal direction of the breather body around said opening with respective sides of adjacent tongues being separated from each other to prevent formation of water membranes along opposite sides of the tongues, and wherein each of said tongues of the breather body has a length larger than inside diameter of the tubular-shaped breather body.

9. An electric motor as set forth in claim 8, wherein each of said tongues of the breather body has a width decreasing gradually toward an extreme end thereof.

10. An electric motor as set forth in claim 8, wherein said free end of the breather body is formed with three tongues having triangular shapes.

11. An electric motor as set forth in claim 8, wherein said free end of the breather body is formed with three tongues having rectangular shapes.

12. An electric motor as set forth in claim 9, wherein said breather is made of elastic material such as synthetic rubber.

13. An electric motor as set forth in claim 10, wherein said breather is made of elastic material such as synthetic rubber.

14. An electric motor as set forth in claim 11, wherein said breather is made of elastic material such as synthetic rubber.

\* \* \* \* \*